(12) United States Patent
Nishimura et al.

(10) Patent No.: US 6,888,278 B2
(45) Date of Patent: May 3, 2005

(54) SPINDLE MOTOR AND DISK DRIVE UTILIZING THE SPINDLE MOTOR

(75) Inventors: Hideki Nishimura, Ohmihachiman (JP); Yoshito Oku, Yasu-gun (JP); Shinya Yano, Ohmihachiman (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/604,975

(22) Filed: Aug. 29, 2003

(65) Prior Publication Data

US 2004/0104634 A1 Jun. 3, 2004

Related U.S. Application Data

(63) Continuation-in-part of application No. 10/063,929, filed on May 27, 2002, now Pat. No. 6,836,388.

(30) Foreign Application Priority Data

| Sep. 13, 2001 | (JP) | ......................................... 2001-277355 |
| Sep. 14, 2001 | (JP) | ......................................... 2001-279021 |
| Nov. 19, 2001 | (JP) | ......................................... 2001-352669 |
| Aug. 29, 2002 | (JP) | ......................................... 2002-251256 |

(51) Int. Cl.$^7$ .............................. F16C 32/06; H02K 7/08
(52) U.S. Cl. ...................... 310/90; 369/269; 360/99.08; 384/107; 384/119; 384/132
(58) Field of Search .................. 360/88, 97.01, 360/99.04, 99.08; 369/258, 258.1, 261, 269; 720/695; 310/90; 384/107, 119, 132

(56) References Cited

U.S. PATENT DOCUMENTS 6,702,466 B2 * 3/2004 Ishikawa et al. ............. 384/112
6,712,513 B2 * 3/2004 Tanaka et al. .............. 384/100
6,717,310 B2 * 4/2004 Yoshikawa et al. ........... 310/90

* cited by examiner

Primary Examiner—Darren Schuberg
Assistant Examiner—Judson H. Jones
(74) Attorney, Agent, or Firm—James Judge

(57) ABSTRACT

Low-profile spindle motor whose entire shaft length is utilized to configure, along an encompassing sleeve, a radial dynamic-pressure bearing section. One end of the shaft is unitary with the rotor, and a cover member closes the other end. Between the sleeve upper-end face and the rotor undersurface a thrust bearing section is configured. Micro-gaps are formed continuing between the sleeve upper-end face and the rotor undersurface; the sleeve inner-circumferential surface and the shaft outer-circumferential surface; and the cover member inner face and the shaft end face, where an axial support section is established. Oil continuously fills the micro-gaps, configuring a full-fill hydrodynamic bearing structure. Hydrodynamic pressure-generating grooves in the radial bearing section are configured either so that no axial flow, or so that a unidirectional flow that recirculates from one to the other axial end of the radial bearing section through a communicating pathway is induced in the oil.

14 Claims, 8 Drawing Sheets

SPINDLE MOTOR AND DISK DRIVE UTILIZING THE SPINDLE MOTOR

This application CIP of U.S. Ser. No. 10/063,929 filed May 27, 2002, now U.S. Pat. No. 6,836,388.

BACKGROUND OF INVENTION

1. Technical Field

The present invention relates to spindle motors and disk-drive devices utilizing the spindle motors; in particular to low-profile spindle motors furnished with hydrodynamic bearings, and to disk-drive devices utilizing the spindle motors.

2. Description of Related Art

In hard-disk drives that drive hard disks and like recording disks, spindle motors utilizing hydrodynamic bearings that, in order to support the shaft and sleeve as either one rotates relative to the other, employ the fluid pressure of a lubricating fluid such as oil interposed between the two are known.

With regard to spindle motors utilizing hydrodynamic bearings of this sort, the applicant in the present application has proposed, in Japanese Laid-Open Pat. App. No. 2000-113582, a spindle motor as illustrated in FIG. 1. Between the bottom face of a rotor 100 and the top-end face of a sleeve 102 in the spindle motor depicted in FIG. 1, a thrust bearing section 104 is configured. Likewise, between the outer circumferential surface of a shaft 106 furnished integrally with the rotor 100, and the inner circumferential surface of the sleeve 102, radial bearing sections 108, 108 are configured. The thrust bearing section 104 generates lifting force on the rotor 100, and the radial bearing sections 108, 108 function to center-balance in the radial direction, and prevent wobble in, the rotor 100.

The spindle motor depicted in FIG. 1 makes the thrust plate that would be a component of the thrust bearing in conventional hydrodynamic bearings unnecessary. The consequent advantage is a simplified structure that reduces the cost of the motor and at the same time enables it to be slimmed, without appreciably compromising the bearing rigidity. Nevertheless, with the advent of the application of disk drives in miniature devices such as portable information terminals, demands are on the rise to make the spindle motors used in the disk drives even slimmer. In addition, calls for lowering the cost of spindle motors still further have gone hand in hand with reducing the cost of disk drives.

Running counter to this is the fact that in its sleeve 102 the spindle motor depicted in FIG. 1 is provided with a communicating passage 110 made up of a through-hole 110a and channels 110b, 110c. The communicating passage 110 brings outside air into the bearing areas—that is, it enables air to circulate into and out of the bearing areas—and thus would expose the end portions of the radial bearing sections 108, 108 to the air. Due to the pumping action of dynamic-pressure-generating grooves formed in each bearing section, areas in which the internal pressure of the oil retained among the bearing sections becomes negative, i.e., at pressure less than atmospheric pressure, arise. Upon a decrease in the internal pressure of the oil to a negative pressure level, air that is entrained in the oil during the process of charging the bearing sections with oil, or that is present due to being swept in by the dynamic-pressure-generating grooves, appears in the form of bubbles. The volume of the bubbles expands with increasing temperature or decreasing external environmental pressure. The volume expansion of the bubbles brings leaking oil toward the exterior of the bearing sections and impairs the spindle motor's durability and reliability. Furthermore, the dynamic-pressure-generating grooves that are formed in the bearing sections come into contact with the bubbles, which causes vibrations and worsens non-repeatable run-out. The rotational precision of the spindle motor therefore worsens. Accordingly, the spindle motor configuration includes the communicating passage 110 in order to exhaust bubbles to the exterior of the bearing sections.

To bore the communicating passage 110 for discharging bubbles in this way a drilling tool is used. The drill bit can only be so small, however, to be strong enough for machining, which limits how small the through-hole 110a and the channels 110b, 110c that constitute the communicating passage 110 can be made. Consequently, the axial dimension of the shaft 106 and the sleeve 102 must necessarily be at least a given size for boring the communicating passage 110 and be extensive enough to maintain bearing rigidity in the radial bearing sections 108, 108. These requirements stand in the way of making the spindle motor slimmer.

What is more, the fact that the through-hole 110a as well as the channels 110b, 110c that constitute the communicating passage 110 are formed in the sleeve 102 complicates that part of the structure and at the same time increases the number of manufacturing processes. An increased-cost spindle motor is the result.

Further still, a ring element 112 that constitutes a retainer for the rotor 100 is fitted onto the end portion of the shaft 106 on the side opposite the rotor 100. In short, because the thrust bearing section 104; the radial bearing sections 108, 108; the through-hole 110a as well as the channels 110b, 110c that constitute the communicating passage 110; and the ring element 112 are arranged in the axial direction stacked along the same axis, they create an impediment to making the spindle motor slimmer.

SUMMARY OF INVENTION

An object of the present invention is to simplify and slim down the structure of a spindle motor while maintaining its rotational stability.

Another object is in a spindle motor to maintain the internal pressure of the oil retained within the bearing gaps at or above atmospheric pressure, to enable preventing the occurrence of air bubbles within the oil.

Yet another object is balancing the internal pressure of the oil retained within the bearing gaps of a spindle motor.

A different object of the present invention is to enable preventing particulate matter from being produced due to contact between the rotor and stator components in a spindle motor.

Moreover, the present invention provides a low-profile, low-cost disk drive that can spin recording disks stably; and another object of the present invention accordingly is to enable preventing the occurrence of read/write errors that originate in oil leaking out from, or in particulate matter being produced by, the spindle motor in a disk drive device.

One example of a spindle motor under the present invention is configured with a radial dynamic-pressure bearing section, in between the inner circumferential surface of the sleeve and the outer circumferential surface of the shaft, that induces hydrodynamic pressure in oil during rotation of the rotor. On at least either one of the upper-end face of the sleeve, or the bottom face of the rotor, the motor is also furnished with dynamic-pressure-generating grooves, configuring a thrust bearing section, that impart radially inward-heading pressure to the oil during rotation of the rotor. In addition, at its tip end the shaft is configured with an axial support section in which pressure that essentially balances with the oil pressure within the thrust bearing section is utilized.

Likewise, in another example of a spindle motor under the present invention, the shaft is formed unitarily with the rotor, wherein a round tubular casing member whose outer peripheral surface functions as a radial bearing surface is attached to the outer peripheral surface of the shaft. A communicating pathway is formed in between the outer circumferential surface of the shaft and the inner circumferential surface of the casing member, enabling axial upper and lower ends of a radial bearing section formed in between the outer peripheral surface of the casing member and the inner peripheral surface of the sleeve to communicate.

Moreover, in a different example of a spindle motor under present invention, a thrust bearing is configured in between the upper-end face of the sleeve, and the bottom-face of the hub, and a radial dynamic bearing is configured in between the inner circumferential surface of the sleeve and the outer circumferential surface of the shaft. Along its outer circumferential surface the sleeve is furnished with a radially flaring annular flange portion, while on the inner circumferential surface of a round-cylindrical wall on the rotor, an annular member whose surface at least is harder than the sleeve is fixedly fitted. The flange portion and the annular member engage with each other to form a rotor retainer.

In one example of a disk drive under the present invention, the spindle motor that spins recording disks includes: a radial dynamic-pressure bearing section, in between the inner circumferential surface of the sleeve and the outer circumferential surface of the shaft, that induces hydrodynamic pressure in oil during rotation of the rotor; and also a thrust bearing section provided with dynamic-pressure-generating grooves, on at least either one of the upper-end face of the sleeve or the bottom face of the rotor, that impart radially inward-heading pressure to the oil during rotation of the rotor. In addition, at its tip end the shaft has an axial support section in which pressure that essentially balances with the oil pressure within the thrust bearing section is utilized.

Likewise, in another example of a disk drive under the present invention, the shaft is formed unitarily with the rotor in the disk-drive spindle motor for spinning recording disks, wherein a round tubular casing member whose outer peripheral surface functions as a radial bearing surface is attached to the outer peripheral surface of the shaft. A communicating pathway is formed in between the outer circumferential surface of the shaft and the inner circumferential surface of the casing member, enabling axial upper and lower ends of a radial bearing section formed in between the outer peripheral surface of the casing member and the inner peripheral surface of the sleeve to communicate.

Moreover, in a different example of a disk drive under present invention, the spindle motor that spins recording disks includes: a thrust bearing configured in between the upper-end face of the sleeve, and the bottom-face of the hub; and a radial dynamic bearing configured in between the inner circumferential surface of the sleeve and the outer circumferential surface of the shaft. A radially flaring annular flange portion is furnished on the outer circumferential surface of the sleeve, while on the inner circumferential surface of a rotor round-cylindrical wall, an annular member whose surface is at least harder than the sleeve is fixedly fitted. The flange portion and the annular member engage with each other to form a rotor retainer.

DETAILED DESCRIPTION

First Embodiment (1) Spindle Motor Configuration

Figure 1:
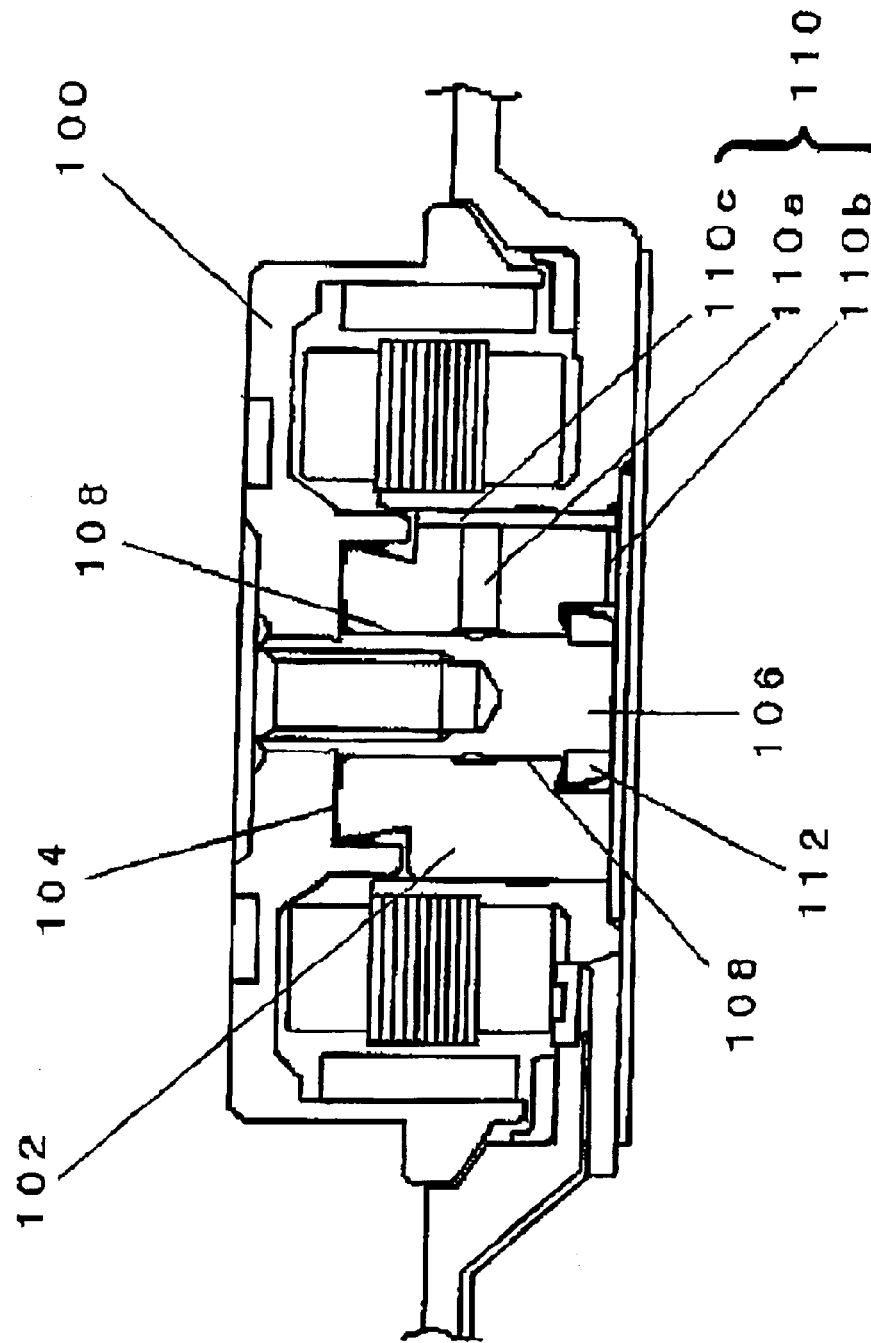
FIG. 1 is a sectional view that illustrates the configurational outline of a conventional spindle motor.
Figure 2:
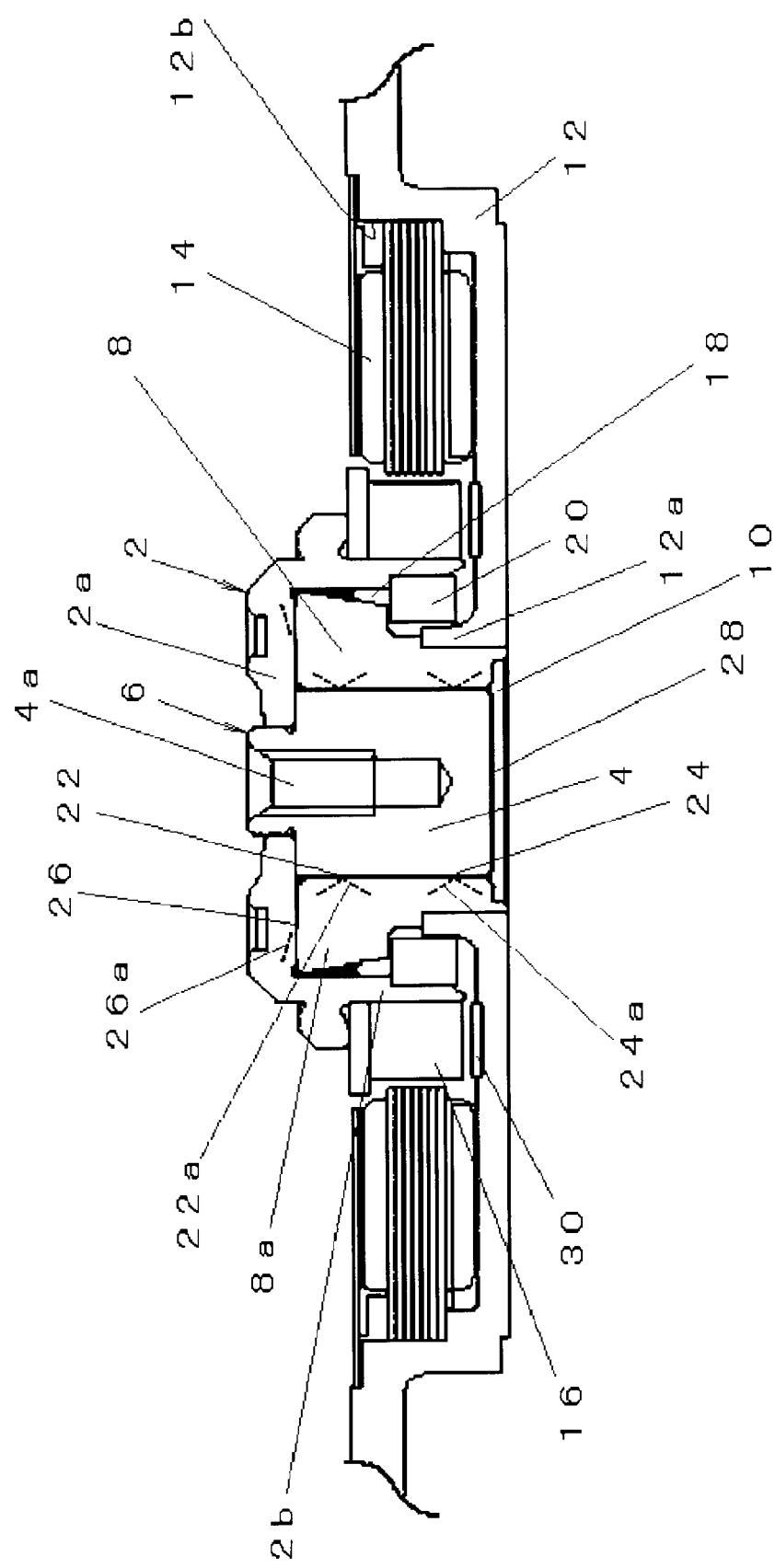
FIG. 2 is a sectional view that illustrates the configurational outline of a spindle motor in a first embodiment of the present invention.

Reference is made to FIG. 2, which illustrates a spindle motor in a first embodiment of the present invention. Set forth in FIG. 2, the spindle motor is furnished with: a rotor 6 made up of a rotor hub 2—composed of an approximately disk-shaped top wall portion 2a, and a round-cylindrical peripheral wall portion 2b depending downward from the outer rim of the top wall portion 2a—and of a shaft 4 one end portion 4a of which is perimetrically inserted into the central portion of the top wall portion 2a of the rotor hub 2; a hollow, round cylindrical sleeve 8 rotatively supporting the shaft 4; a sealing cap 10 opposing the end face of the shaft 4 along its free end, and closing over the lower portion of the sleeve 8; and a bracket 12 formed integrally with a round cylindrical portion 12a for anchoring the sleeve 8.

The bracket 12 has a round cupped portion centered on the round cylindrical portion 12a; and a stator 14 having a plurality of teeth that project radially inward is arranged on the inner circumferential surface 12b of a peripheral wall that the outer circumferential edge of the cupped portion defines. Likewise, a rotor magnet 16 that opposes the stator 14 via a radially inward clearance therefrom is fixedly fitted to the outer circumferential surface of the peripheral wall portion 2b of the rotor hub 2.

Figure 6:
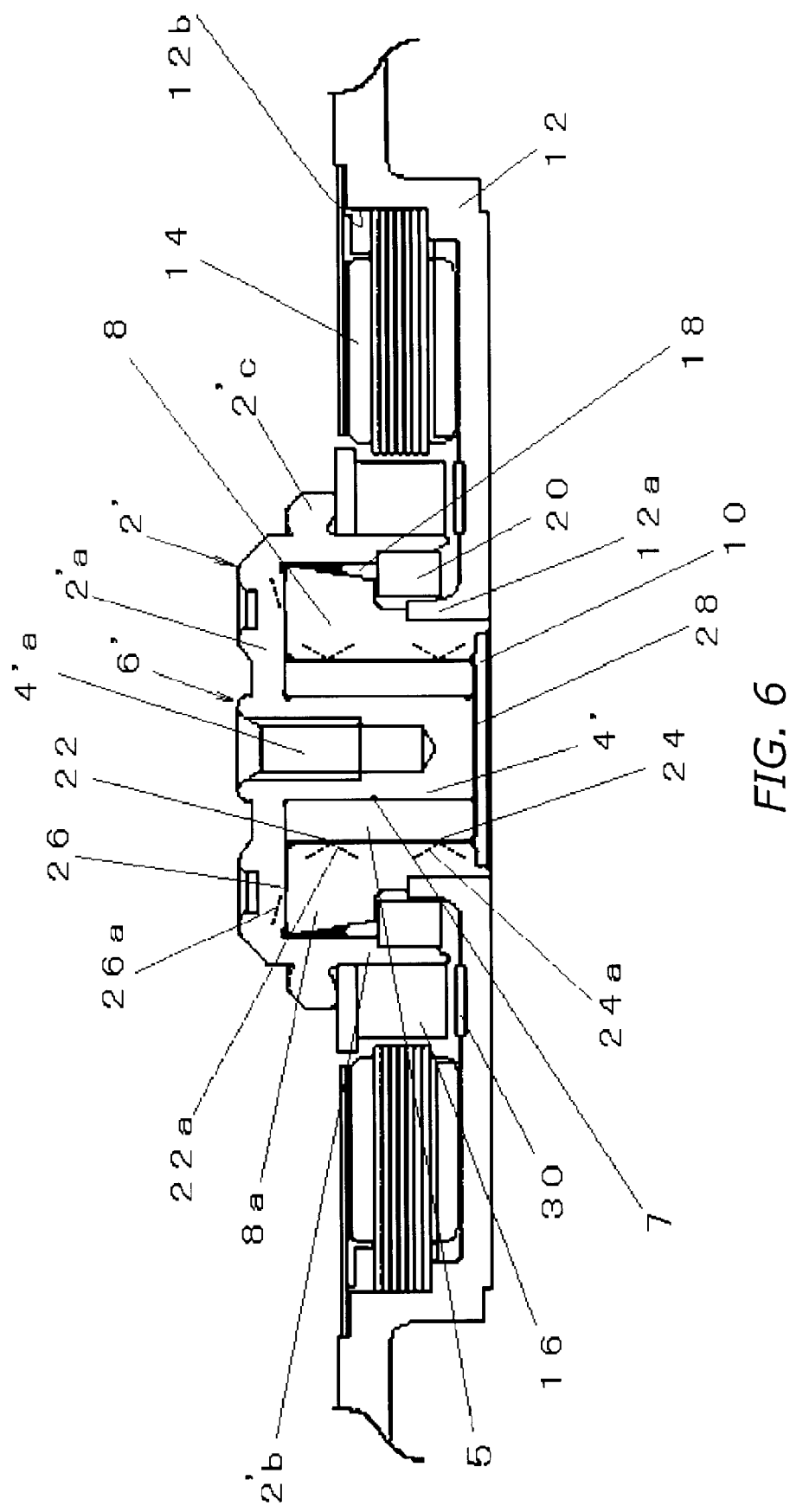
FIG. 6 is a sectional view that illustrates the configurational outline of a spindle motor in a second embodiment of the present invention.

A flange-shaped disk-mounting portion 2c for carrying recording disks on which information is recorded (in FIG. 6, represented as recording disks 53) is formed on an outer circumferential portion of the peripheral wall portion 2b of the rotor hub 2. A threaded hole 4b is formed in the upper-end portion of the shaft 4 (its end at the top wall portion 2a of the rotor hub 2). The recording disks are loaded onto the disk-mounting portion 2c, and after being retained by a clamp (not illustrated), the recording disks are fixedly secured to the rotor hub 2 by fastening a screw (not illustrated) into the threaded hole 4b.

An unbroken series of micro-gaps is formed in between the upper-end face of the sleeve 8 and the undersurface of the top wall portion 2a of the rotor hub 2, and—continuing from the top wall portion 2a of the rotor hub 2—in between outer circumferential surface of the shaft 4 and the inner circumferential surface of the sleeve 8, and continuous therewith, in between the end face of the shaft 4 and the inner face of the sealing cap 10. Oil continuously fills the micro-gaps without interruption, configuring a so-called full-fill hydrodynamic bearing structure. In this respect, the configuration of the bearings and their supporting function will be described in detail later.

The upper-end portion of the sleeve 8 outer circumferential surface is made into an annular flange portion 8a that flares radially outward and that is contoured into an incline such that the outer circumferential surface contracts parting away from the upper-end face of the sleeve 8. The flange portion 8a radially opposes, without being in contact with, the inner circumferential surface of the peripheral wall portion 2b of the rotor hub 2.

Because as noted above the outer circumferential surface of the flange portion 8a is contoured into an incline, the gap defined in between the inner circumferential surface of the peripheral wall portion 2b and the outer circumferential surface of the flange portion 8a forms a taper whose radial clearance gradually increases heading axially downward (in the direction toward the distal rim of the peripheral wall portion 2b). In particular, the inner circumferential surface of the peripheral wall portion 2b and the outer circumferential surface of the flange portion 8a cooperate to configure a taper-seal area 18. With regard to the oil retained in the micro-gap series formed (as noted above) in between the upper-end face of the sleeve 8 and the undersurface of the top wall portion 2a of the rotor hub 2, and—continuing from the top wall portion 2a of the rotor hub 2—in between outer circumferential surface of the shaft 4 and the inner circumferential surface of the sleeve 8, and continuous therewith, in between the end face of the shaft 4 and the inner face of the sealing cap 10: the oil-air boundary is in the taper-seal area 18 alone, and forms a meniscus where the oil surface tension and the outside air pressure balance.

The taper-seal area 18 functions as an oil reservoir, and in accordance with the amount of oil retained within the taper-seal area 18, the location where the boundary forms is movable to suit. Accordingly, attendant on reduction in the amount of oil retained, oil held within the taper-seal area 18 is supplied to the bearing sections; and meanwhile, expanded oil due to thermal swelling is accommodated within the taper-seal area 18.

In this way, the taper-shaped clearance is formed in between the outer circumferential surface of the flange portion 8a of the sleeve 8, and the inner circumferential surface of the peripheral wall portion 2b of the rotor hub 2, to configure the taper-seal area 18 employing surface tension. This configuration makes the taper-seal area 18 diametrically larger than the bearing sections, and meanwhile lets the axial dimension of the taper-seal area 18 be relatively large. Consequently, the volumetric capacity within the taper-seal area 18 is enlarged, making it sufficiently complementary for thermal expansion of the greater amount of oil retained in hydrodynamic bearings having the full-fill structure.

An annular retaining ring 20 is fixedly attached by means of an adhesive to the peripheral wall portion 2b at its end distally beyond the taper-seal area 18. The retaining ring 20 fits into place at the lower-end portion of the outer circumferential surface of the sleeve 8 without coming into contact against the lower part of the flange portion 8a, whereby a structure that keeps the rotor 6 from coming out from the sleeve 8 is configured. By thus configuring the rotor 6 retaining structure along the outer circumferential surface of the sleeve 8, a pair of radial bearings, which will later be described in detail, and the retaining structure are not arranged lying in a row along the same axis. This accordingly enables the entire length of the shaft 4 to be put to effective use as a bearing, and makes it possible to scale down the motor into a lower profile while maintaining bearing rigidity.

Here, arranging the rotor 6 retaining structure external to the bearings, as is the case with the spindle motor illustrated in FIG. 2, in order to slim the profile of the motor means that the retainer is disposed within the air (referred to hereinafter as "the dry area").

In a hard disk drive, for example, in order to shorten seek time the heads and the recording surface of the recording disks are separated by a clearance of as little as 1 □m or less. Therefore, even micro-particles can get caught in the clearance between a head and a recording surface, becoming the causative source of a so-called head crash. For spindle motors employed under such environments, this sort of particle spatter is a serious problem in terms of quality.

If the retainer were to be configured inside the bearings, metal abrasion dust that would be produced during rotation by contact occurring in the retainer section due to exteriorly acting vibrations and shock would be captured by the oil retained in the bearing sections. The dust therefore could not be scattered away to the spindle motor exterior. In contrast, configuring the retainer section in the dry area means that particulate matter produced in the retainer section readily gets scattered away to the exterior of the spindle motor.

The production of particulate matter during contact becomes even more pronounced in those particular situations in which the rotary-side components and the stationary-side components that compose the retaining section are made from the same type of metal.

Under these circumstances, making the retaining ring 20 harder at least on its surface than the sleeve 8 makes scaling down the motor profile while gaining desired rotational precision a reality. At the same time, the at least superficially harder retaining ring 20 enables preventing as much as possible the production of particulate matter due to contact between the retaining ring 20 and the sleeve 8 that together constitute the retainer. Accordingly, even if exterior vibrations and shock have an impact on the spindle motor when the rotor 6 spins, and contact between the retaining ring 20 and the sleeve 8 occurs, the generation of particulate matter will be prevented.

In this instance, forming the retaining ring 20 from a ceramic material makes surer prevention of the production of particulate matter possible, without increasing the manufacturing process steps.

Likewise, generation of particulate matter due to contact between the sleeve 8 and the retaining ring 20 can be prevented by forming the retaining ring 20 from, e.g., a stainless-steel material and carrying out a surface-hardening process on the surface thereof. Nickel plating, DLC (diamond-like carbon) coating, or nitriding treatments are preferable as surface treatments in this case.

As far as forming the retaining section is concerned, in either of the foregoing cases, the sleeve 8 and retaining ring 20 can be made from raw materials that differ—formed using a stainless-steel material or a copper raw material.

The upper face of the retaining ring 20 opposes the undersurface of the flange portion 8a across an axial gap that is continuous with the taper-seal area 18 and whose clearance is smaller than the minimum clearance of the radial gap in the taper-seal area 18.

By establishing the clearance of the axial micro-gap defined between the upper face of the retaining ring 20 and the undersurface of the flange portion 8a to be as small as possible, it functions as a labyrinth seal when the spindle motor is spinning. The difference between the air current speed in the axial micro-gap and the air current speed in the radial clearance defined in the taper-seal area 18 is thus enlarged, and the resistance to outflow of oil vapor occurring due to gasification is made greater. This keeps the vapor pressure in the vicinity of the oil boundary surface high, so as further to prevent vapor dispersal of the oil.

Setting up a labyrinth seal in this way in association with the taper-seal area 18 not only checks outflow of oil as a fluid, but makes it possible to deter outflow to the motor exterior of oil mist produced by the oil gasifying due to elevation in the exterior ambient temperature of the motor. This consequently works to prevent decline in the retained amount of oil and maintain stabilized bearing performance over the long term, making the bearings highly durable and reliable.

(2) Bearing Configuration

Figure 3:
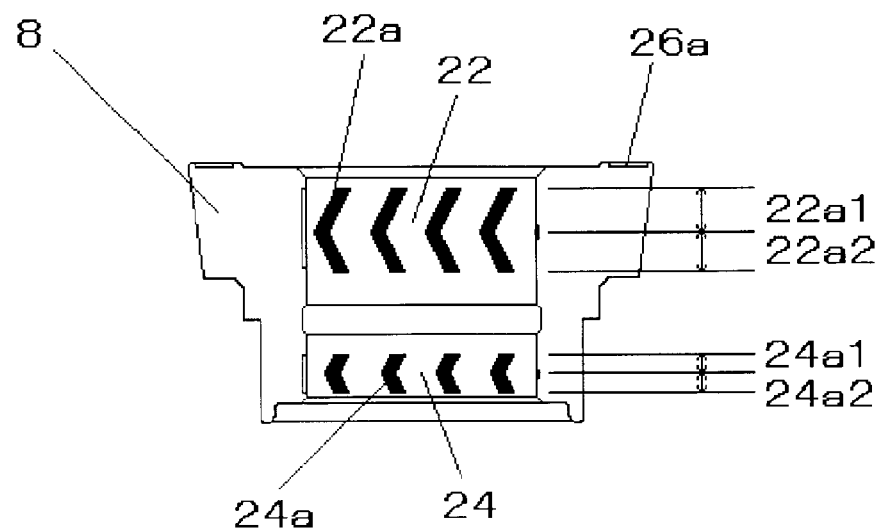
FIG. 3 is a fragmentary enlarged sectional view that schematically illustrates the configuration of herringbone grooves formed in a radial bearing section of the spindle motor in the first embodiment of the present invention.

Herringbone grooves 22a as illustrated in FIG. 3 are formed on the inner circumferential surface of the sleeve 8 by its upper-end face so as to induce hydrodynamic pressure in the oil when the rotor 6 spins. Each of the herringbone grooves 22a is configured by a pair of linked spiral grooves 22a1 and 22a2 inclining into each other from mutually opposing directions with respect to the rotary direction. An upper radial hydrodynamic bearing section 22 is constituted between the inner circumferential surface of the sleeve 8 where the grooves 22a are formed and the outer circumferential surface of the shaft 4.

Likewise, herringbone grooves 24a are formed on the inner circumferential surface of the sleeve 8 by the free-end portion of the shaft 4 so as to induce hydrodynamic pressure in the oil when the rotor 6 spins. Each of the herringbone grooves 24a is configured by a pair of spiral grooves 24a1 and 24a2 inclining into each other from mutually opposing directions with respect to the rotary direction. A lower radial hydrodynamic bearing section 24 is constituted between the inner circumferential surface of the sleeve 8 where the grooves 24a are formed and the outer circumferential surface of the shaft 4.

Here, the herringbone grooves 22a, 24a that are formed in the upper and lower radial hydrodynamic bearing sections 22, 24 are established so that the spiral grooves 22a1 and 22a2, and 24a1 and 24a2 generate essentially equal pumping force—so that the groove fundamentals, which are axial dimension, inclination angle with respect to the rotary direction, or groove width and depth, will be the same. That is, the herringbone grooves 22a, 24a are established so as to be axially symmetrical with respect to where the spiral grooves 22a1 and 22a2, and 24a1 and 24a2 join. Accordingly, in the upper and lower radial hydrodynamic bearing sections 22, 24 maximum pressure appears in the axially central portion (where the spiral grooves join) of each bearing section, meaning that the pumping action by the spiral grooves 22a1 and 22a2, and 24a1 and 24a2 is non-uniform with respect to either direction axially, whereby no axial flow is generated in the oil.

Figure 4:
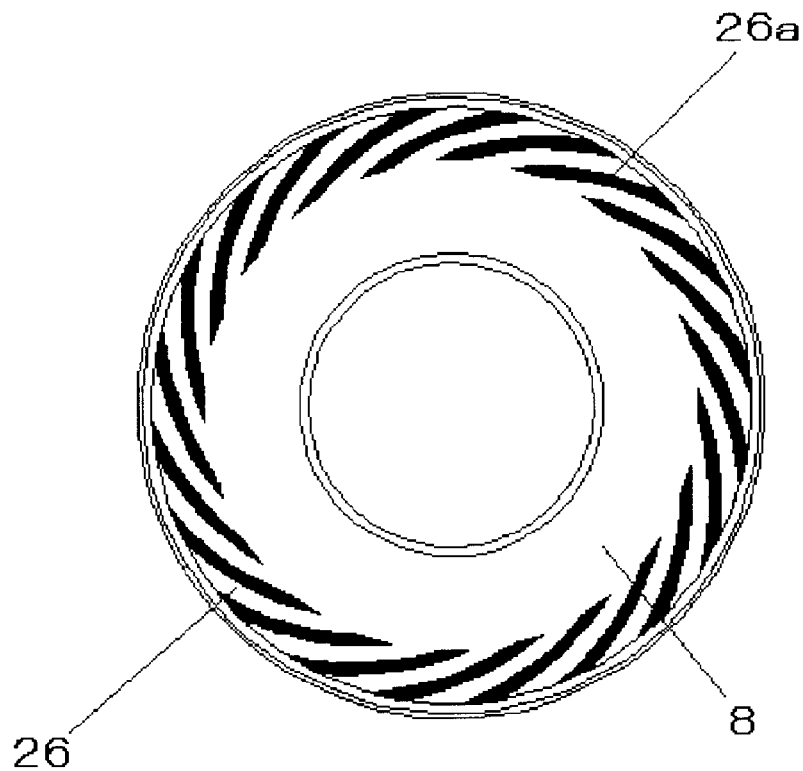
FIG. 4 is a plan view that schematically illustrates the configuration of spiral grooves formed in a thrust bearing section of the spindle motor in the first embodiment of the present invention.

In addition, as illustrated in FIG. 4 pump-in spiral grooves 26a are formed on the upper-end face of the sleeve 8 so as to induce radially inward-heading pressure (toward the shaft 4) in the oil when the rotor 6 spins, and a thrust bearing section 26 is constituted between the upper-end face of the sleeve 8 and the undersurface of the rotor hub 2 top wall portion 2a.

Accordingly, structuring the spindle motor to be a full-fill type bearing configuration while maintaining desired bearing rigidity and—in not requiring a thrust plate to configure the thrust hydrodynamic bearing—retaining a simplified, reduced-cost enabling structure makes it possible further to slim the motor profile and lower its cost.

Likewise, an axial support section 28 that, as will later be described in detail, employs oil internal pressure heightened by the spiral grooves 26a of the thrust bearing section 26, is configured in between the free-end end face of the shaft 4 and the inner face of the sealing cap 10 as a hydrostatic bearing section.

(3) Manner in Which Rotor is Supported

Figure 5:
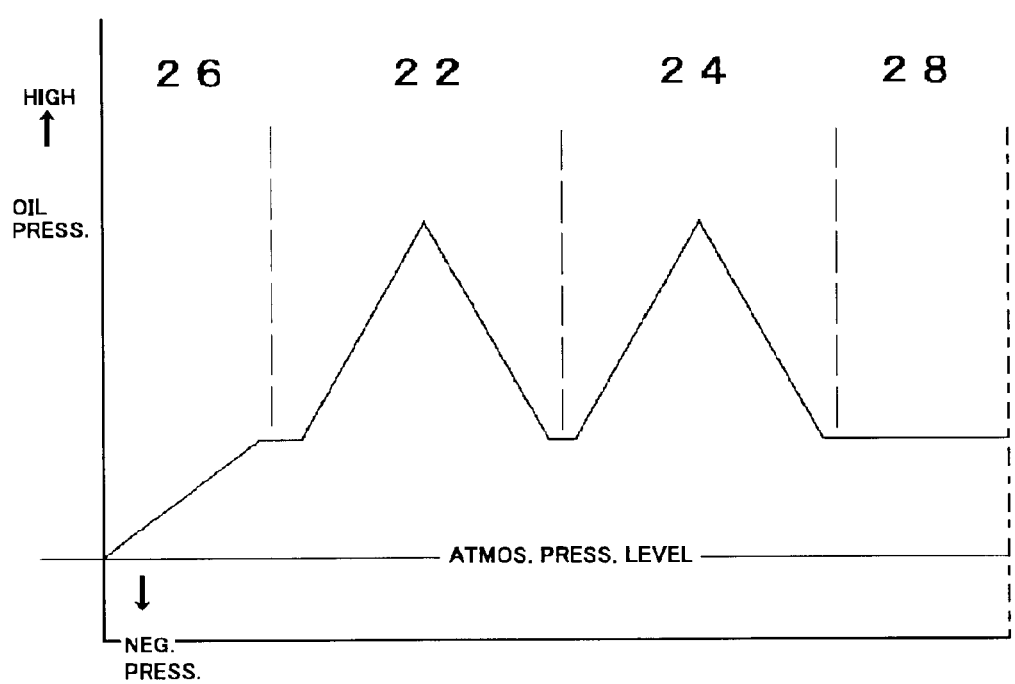
FIG. 5 is a conceptual pressure-distribution diagram schematically illustrating pressure distribution in the spindle motor hydrodynamic bearing oil.

How the rotor 6 is supported by the bearings configured as described in the foregoing will be detailed with reference to FIG. 5. Here, FIG. 5 is a pressure-distribution chart schematically representing relative relationships in pressure distribution, developing from bearing to bearing, of the oil retained in the micro-gap formed in between the upper-end face of the sleeve 8 and the undersurface of the top wall portion 2a of the rotor hub 2, and—continuing from the top wall portion 2a of the rotor hub 2—in between outer circumferential surface of the shaft 4 and the inner circumferential surface of the sleeve 8, and continuous therewith, in between the end face of the shaft 4 and the inner face of the sealing cap 10. Because the pressure distribution in the spindle motor is axially symmetrical, however, the pressure distribution with respect to the rotational center axis, indicated by the dotted-dashed line in FIG. 5, for the region that would be on the opposite side of a vertical section through the spindle motor is omitted. Further, the numbers shown in FIG. 5 are the same numbers that mark each of the bearing sections in FIG. 2.

Accompanying rotation of the rotor 6, the pumping force from the herringbone grooves 22a, 24a in the upper and lower radial hydrodynamic bearings 22, 24 is heightened, producing hydrodynamic fluid pressure. As indicated by the distribution graph in FIG. 5, the pressure through the herringbone grooves 22a, 24a in the upper and lower radial hydrodynamic bearings 22, 24 rises abruptly at their either ends, becoming maximal in the places where the spiral grooves 22a1 and 22a2, and 24a1 and 24a2 join. Utilizing the hydrodynamic pressure generated in the upper and lower radial hydrodynamic bearings 22, 24, the shaft 4 is supported axially along its upper/lower ends, and actions that center the shaft 4 and restore it from deviations are borne.

Accompanying rotation of the rotor 6, radially inward-heading pressure is induced in the oil in the thrust bearing section 26 by the pump-in spiral grooves 26a. The flow of the oil is accelerated by the radially inward-heading pressure, raising the oil internal pressure and generating hydrodynamic pressure acting in a lifting direction on the rotor 6. As indicated in FIG. 5, the hydrodynamic pressure induced in the thrust bearing section 26 does not rise abruptly as is the case with the upper and lower radial hydrodynamic bearings 22, 24; rather, at maximum it is at a level exceeding atmospheric pressure to a certain degree.

Owing to the pressure generated in the thrust bearing section 26, pressure-wise the oil retained—continuing from the top wall portion 2a of the rotor hub 2—in between outer circumferential surface of the shaft 4 and the inner circumferential surface of the sleeve 8, and continuous therewith, in between the end face of the shaft 4 and the inner face of the sealing cap 10 is essentially sealed. Likewise, the fact that the herringbone grooves 22a, 24a formed in the upper and lower radial hydrodynamic bearings 22, 24 have an axially symmetrical form, and that the dynamic pressure generated is balanced in the axial direction means that, as described above, axially directed flow is not induced in the oil. Thus, the internal pressure of the oil retained in between the outer circumferential surface of the shaft 4 and the inner circumferential surface of the sleeve 8, and continuous therewith, in between the end face of the shaft 4 and the inner face of the sealing cap 10 balances with the internal pressure of the oil retained in the thrust bearing section 26. Accordingly, as indicated in FIG. 5, in either of these areas the internal pressure of the oil will be on par with that of the oil retained in the thrust bearing 26. Negative pressure, wherein the internal pressure would go below atmospheric pressure, will not be generated in the oil retained within these micro-gaps.

Problems with leakage of oil out to the bearing exterior, with vibrations, or with worsening of non-repeatable runout, which arise due to air bubbles residing within the oil, are accordingly prevented from occurring. Thus, a communicating passage for communicating the bearing interior with the external air is thereby rendered unnecessary.

As noted above, the pressure generated in the thrust bearing 26 it is at a level exceeding atmospheric pressure to a certain degree, but this pressure alone is unlikely to lift the rotor 6 sufficiently. Nevertheless, the internal pressure of the oil retained in the axial support section 28 formed between the free-end end face of the shaft 4 and the inner face of the sealing cap 10 as described above will be pressure equal to the oil internal pressure heightened by the hydrodynamic pressure induced in the thrust bearing section 26. That is, although a hydrodynamic bearing is not configured between the inner face of the sealing cap 10 and the end face of the shaft 4, the axial support section 28—which functions as a so-called hydrostatic pressure bearing, and which in cooperation with the thrust bearing 26 allows the rotor 6 to be lifted—is configured.

Accordingly, the thrust bearing section 26 and the axial support (hydrostatic bearing) section 28 cooperate to enable the rotor 6 to be sufficiently lifted.

Here, as illustrated in FIG. 2 an annular thrust yoke 30 made of a ferromagnetic material is disposed in a position on the bracket 12 opposing the rotor magnet 16. This generates axially directed magnetic attraction between the rotor magnet 16 and the thrust yoke 30 that balances the lifting pressure on the rotor 6 generated in the thrust bearing section 26 and the axial support section 28, stabilizes the thrust-directed support of the rotor 6, and controls occurrence of over-lift that would buoy the rotor 6 more than necessary. A thus magnetically urging force can also be made to act on the rotor 6 by, for example, displacing the magnetic centers of the stator 14 and the rotor magnet 16 in the axial direction.

Second Embodiment (4) Spindle Motor Configuration

Next, using FIGS. 6 through 8 the configuration of a spindle motor in a second embodiment of the present invention will be described. Here, components in the second embodiment that are identical with the first embodiment are marked with the same reference numerals, and explanation thereof is omitted. Likewise, the bearing configuration is essentially identical with the first embodiment, as is the way in which the bearings support the rotor, and the configuration is therefore marked with the same reference numerals.

Set forth in FIG. 6, the spindle motor includes: a rotor 6' made up of a rotor hub 2'—composed of an approximately disk-shaped top wall portion 2'a, and a round-cylindrical peripheral wall portion 2b depending downward from the outer rim of the top wall portion 2a—and of a shaft 4' formed integrally with the central part of the top wall portion 2'a of the rotor hub 2'; and a round-cylindrical casing member 5 that is fitted to the outer circumferential surface of the shaft 4'.

(5) Configuration and Function of Communicating Pathway

Figure 7:
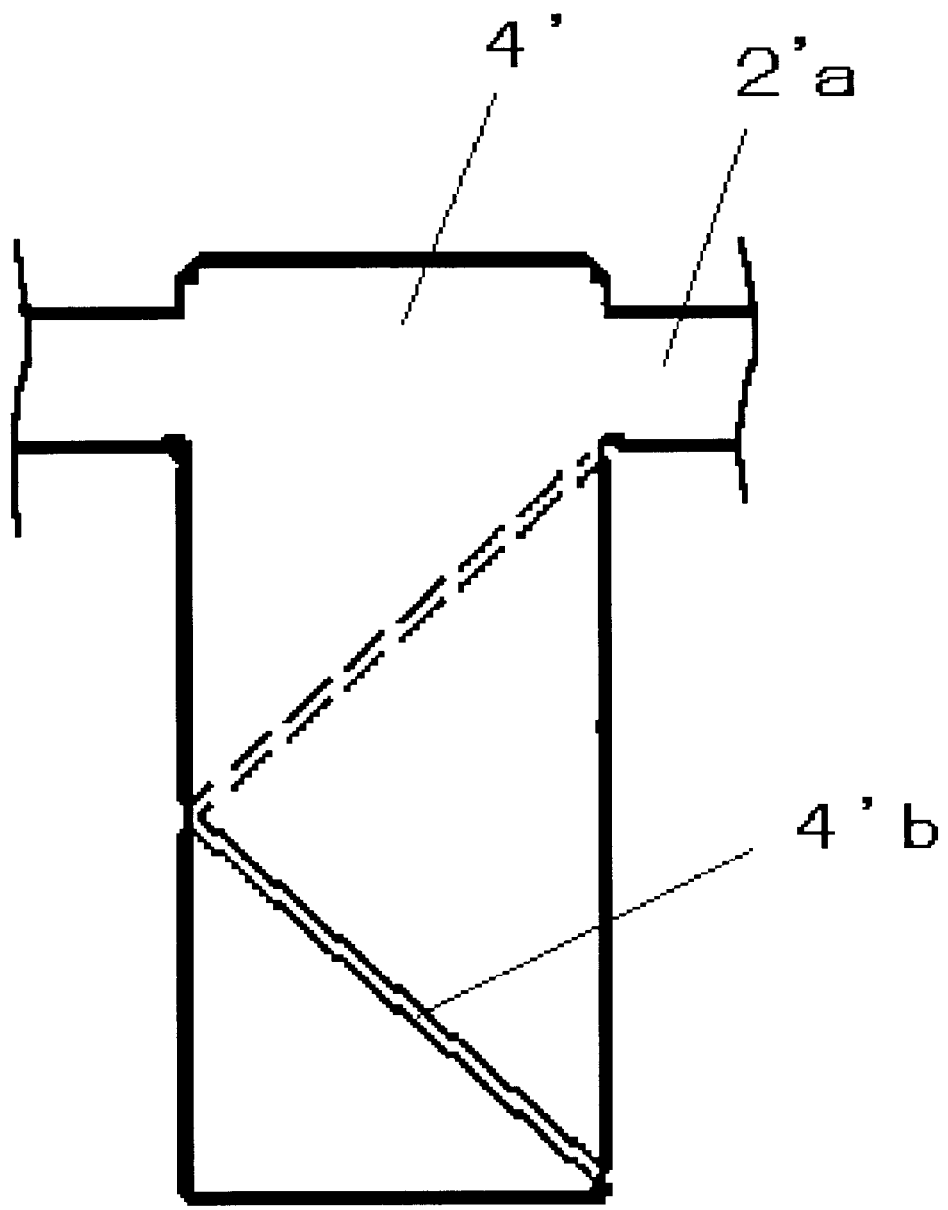
FIG. 7 is an elevational, fragmentary view showing a portion of the shaft enlarged from the spindle motor depicted in FIG. 6.
Figure 8:
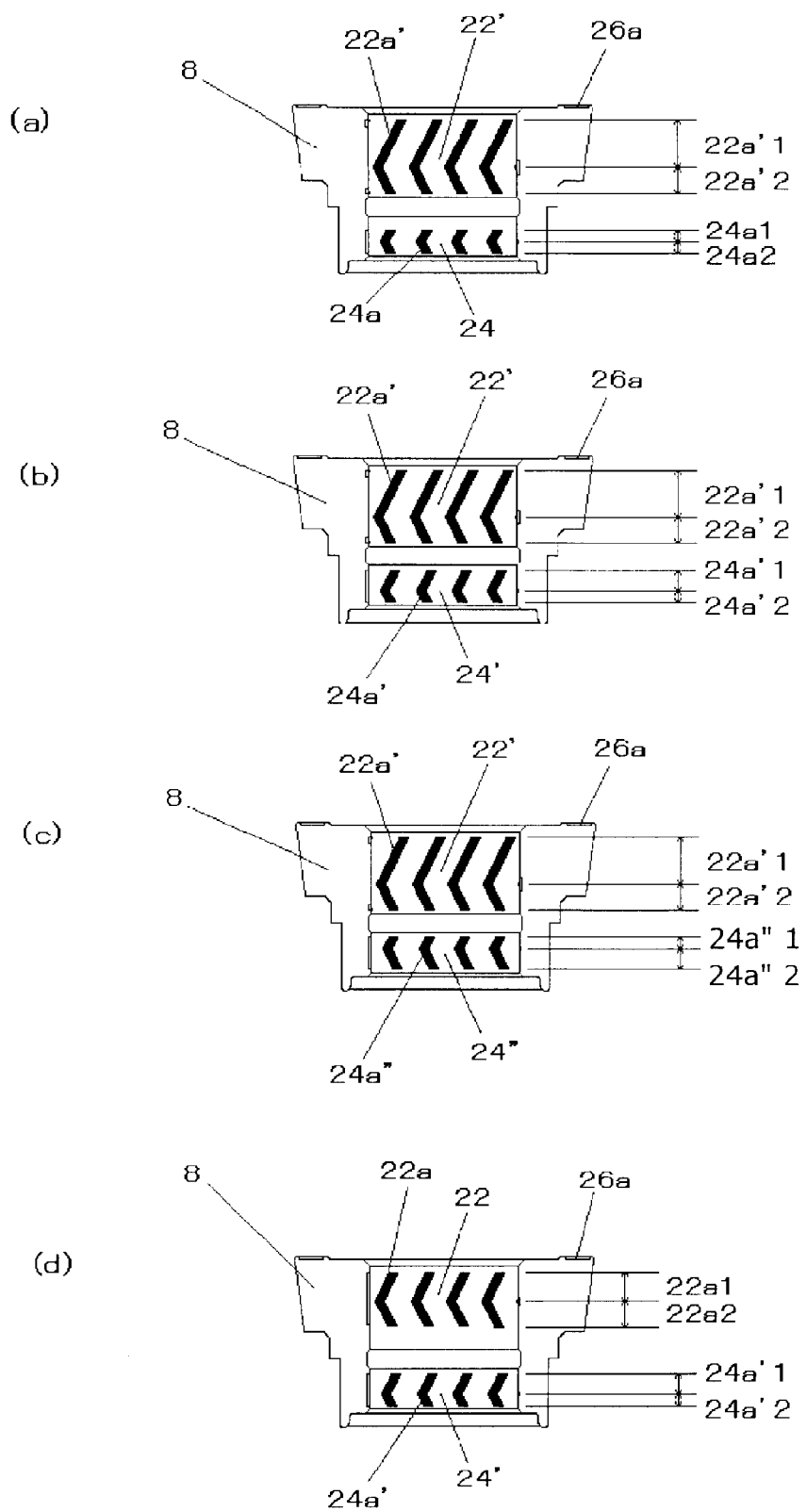
FIGS. 8A through 8D are fragmentary enlarged sectional views that schematically illustrate modified examples of the configuration of herringbone grooves formed in a radial bearing section of the spindle motor in a second embodiment of the present invention.

Reference is made now to FIG. 7, which is an elevational view representing the shaft 4' enlarged. As illustrated in FIG. 7, a single helical groove 4a' (represented in part by dashed lines) is furnished on the outer circumferential surface of the shaft 4', running in the axial direction from its upper to its lower end.

The helical groove 4a' is formed by a machining process to have a sectional contour that is approximately rectangular or triangular, or else semicircular. Here, when carrying out the process of machining the helical groove 4'a into the outer circumferential surface of the shaft 4', the process can be carried out in a single chucking.

With the casing member 5 fitted onto the outer circumferential surface of the shaft 4', in between it and the inner circumferential surface of the casing member 5' a helix-shaped communicating pathway 7 is defined by the helical groove 4'a. The communicating pathway 7 runs along the inner circumferential surface of the casing member 5' from the upper to the lower end portion in the axial direction, i.e., the pathway 7 is continuous with the micro-gaps formed in thrust bearing section 26 and the axial support section 28. Within the communicating pathway 7, oil is retained continuously with the oil held in the thrust bearing section 26 and in the axial support section 28. Likewise, the internal pressure of the oil retained within the communicating pathway 7 balances with the internal pressure of the oil retained in the bearing sections.

It can sometimes happen that on account of manufacturing discrepancies in the inner circumferential surface of the sleeve 8 and the outer circumferential surface of the casing member 5 becoming combined in the worst case scenario within tolerances, or due to the impact of stresses that occur in fastening the screw into the threaded hole 4'b provided in the shaft for retaining recording disks on the disk disk-mounting portion 2'c of the rotor hub 2', the clearance of the micro-gap formed in between the inner circumferential surface of the sleeve 8 and the outer circumferential surface of the casing member 5 will be non-uniform between the upper-end and lower-end sides in the axial direction. Should the micro-gap formed between the sleeve 8 inner circumferential surface and the casing member 5 outer circumferential surface be non-uniform, an abnormal flow will be induced in the oil. As a consequence, a disparity in internal pressure of the oil in the upper end and in the lower end axially of the micro-gap formed between the sleeve 8 inner circumferential surface and the casing member 5 outer circumferential surface—i.e., a pressure disparity between the thrust bearing section 26 and the axial support section 28—will arise. If this oil internal pressure difference is left as is, oil will happen to flow from the lower to the upper end axially, giving rise to negative pressure in the axial support section 28. Likewise, oil will happen to flow from the upper to the lower end axially, raising the internal pressure of the oil in the axial support section 28 more than is necessary and producing over-lift on the rotor 6.

Countering this, the communicating pathway 7 that is continuous with micro-gaps formed in the thrust bearing section 26 and the axial support section 28, and that retains oil continuously with the oil retained in these thrust-bearing and bearing sections 26 and 28, is provided. Therefore, even if the above-noted axial flow is induced in the oil, and a disparity arises in the internal pressure of the oil in the upper end and in the lower end axially of the micro-gap formed between the sleeve 8 inner circumferential surface and the casing member 5 outer circumferential surface, because a flow of oil passing through the communicating pathway 7 from the internal-pressure high end to the low end will occur, the internal pressure of the oil retained in each of the bearing areas will balance, preventing incidents of negative pressure and over-lift.

The presence of a communicating pathway 7 as in the foregoing in a spindle motor of the second embodiment means that in the herringbone grooves 22a and 24a in the radial bearing sections 22 and 24 formed in between the inner circumferential surface of the sleeve 8 and the outer circumferential surface of the casing member 5, configurations such as indicated in FIGS. 8A through 8D for the spiral grooves 22a1 and 22a2, and 24a1 and 24a2 that form the herringbone grooves 22a and 24a, other than being symmetrical with respect to where they join—as is the case in the first embodiment—are possible.

(6) Modified Examples of Second Embodiment (6-1) Modification Example 1

In the modification example diagrammed in FIG. 8A herringbone grooves 22a' formed in an upper radial bearing section 22' have an asymmetrical configuration in the axial direction, while the herringbone grooves 24a formed in the lower radial bearing section 24 have a symmetrical configuration with respect to where they join, likewise as is the case in the first embodiment.

To be more specific: In the herringbone grooves 22a' formed in the upper radial bearing section 22', spiral grooves 22a'1 located toward the upper end of the sleeve 8 (thrust bearing section 26) are established so as to be longer in axial dimension than spiral grooves 22a'2 located toward the lower radial bearing section 24. Consequently, the place in which the pairs of spiral grooves 22a'1 and 22a'2 join is lower than the center of the upper radial bearing section 22'—i.e., is located biased toward the lower radial bearing section 24. Therefore, the pumping action by the spiral grooves 22a'1 on the oil when the rotor 6 spins surpasses the pumping action by the spiral grooves 22a'2, which in terms of the upper radial bearing section 22' induces in the oil a flow heading toward the lower end of the sleeve 8 (toward the lower radial bearing section 24).

Rendering the herringbone grooves 22a' in the upper radial bearing section 22' in an axially unbalanced configuration in this way keeps the pressure in the region between the upper radial bearing section 22' and the lower radial bearing section 24 at positive pressure greater than atmospheric, preventing the occurrence of negative pressure. Then on account of the pressuring force generated in the herringbone grooves 22a' the oil always flows toward the lower end of the sleeve 8; and oil that has flowed toward the lower end of the sleeve 8 recirculates through the communicating pathway 7 from along the lower end to along the upper end of the sleeve 8, and is pushed in toward the lower end of the sleeve 8 all over again by the upper radial bearing section 22', wherein a constant oil circulation path is formed.

Thus the herringbone grooves 22a' causing the oil to flow at all times in a predetermined direction within the bearing gaps provides for stability in the balance of pressure in every region in the oil retained within the bearing gaps, which ensures that occurrences of negative pressure and of over-lift on the rotor 6 are prevented. What is more, even in instances where manufacturing discrepancies or deformation stress during assembly have occurred, with oil circulation in a constant direction being secured the acceptable range—beyond which is unacceptability whose fault lies in processes and assembly—is markedly enlarged, therefore bettering yields.

(6-2) Modification Example 2

Then as diagrammed in FIG. 8B, it is also possible to render in an axially asymmetrical configuration not only the upper radial bearing section 22', but also the lower radial bearing section 24', in a makeup where among the spiral grooves 24a'1 and 24a'2 constituting the herringbone grooves 24a' formed therein, establishing the spiral grooves 24a'1, located toward the upper radial bearing section 22', so as to be longer in axial dimension than the spiral grooves 24a'2, located toward the lower end of the sleeve 8, positions the place in which they join biased toward the lower end of the sleeve 8.

Thus configuring not only the upper radial bearing section 22' but also the lower radial bearing section 24' so as induce in the oil a flow heading toward the lower end of the sleeve 8 makes the pressure in the hydrostatic bearing section 28 higher, and strengthens the lifting force on the rotor 6. Because this accordingly makes it so that higher-burden loads can be supported, utilization in situations where a plurality of disks is rotationally driven is made possible. Furthermore, a more active circulation is urged upon the oil, which is effective in preventing occurrences of negative pressure and of over-lift on the rotor 6.

(6-3) Modification Example 3

With modification example 3, diagrammed in FIG. 8C, in the herringbone grooves 22a' formed in the upper radial bearing section 22' the spiral grooves 22a'1 located toward the thrust bearing section 26 are established so as to be longer in axial dimension than the spiral grooves 22a'2 located toward the lower radial bearing section 24, likewise as is the case in modification examples 1 and 2, so that a flow toward the lower radial bearing section is generated in the oil. What is different, however, is that in herringbone grooves 24a" formed in lower radial bearing section 24", spiral grooves 24a"2 located toward the lower end of the sleeve 8 are formed so as to be slightly longer in axial dimension than spiral grooves 24a"1 located toward the upper radial bearing section 22'.

This configuration consequently prompts an oil flow heading from along the lower radial bearing section 24' toward the upper radial bearing section 22', preventing incidence of negative pressure in the regions between the upper radial bearing section 22' and the lower radial bearing section 24". It should be understood that as the dimensional difference between the spiral grooves 24a"1 and the spiral grooves 24a"2 making up the herringbone grooves 24a" of the lower radial bearing section 24" is less than the dimensional difference in the herringbone grooves 22a' of the upper radial bearing section 22', oil flow generated in the upper radial bearing section 22' and heading toward the lower radial bearing section 24" is therefore not hindered by the oil flow that the lower radial bearing section 24" generates heading toward the upper radial bearing section 22'.

(6-4) Modification Example 4

An additionally possible modification, as diagrammed in FIG. 8D, is to render the herringbone grooves in the upper radial bearing section herringbone grooves 22a likewise as in the first embodiment, in a configuration symmetrical with respect to the joints, and to render the herringbone grooves in the lower radial bearing section herringbone grooves 24a' likewise as with Modification Example 2 illustrated in FIG. 8B, in an asymmetrical form biased toward the lower end of the sleeve 8. In this case, the dimensional difference between the spiral grooves 24a'1 and 24a'2 in the lower radial bearing section 24' is less than is the case with the herringbone grooves on the upper radial bearing section side rendered in an asymmetrical configuration. Consequently, a relatively large bearing span between upper and lower radial bearing sections 22 and 24' can be secured to make it possible to enhance bearing rigidity, while an oil flow heading toward the lower end of the sleeve 8 is still generated to expand tolerance in terms of manufacturing discrepancy or deformation stress during assembly.

Here, inducing in the oil a flow heading from along the radial bearing sections toward the lower end of the sleeve 8, as indicated in FIGS. 8A through 8D, means that the internal pressure of the oil retained in the hydrostatic bearing section 28 balances to the sum of flow pressure induced in the thrust bearing section 26 and the flow pressure of the oil from along the radial bearing sections. This enables more stabilized support with increased bearing load capacity.

(7) Configuration of Disk Drive Device

Figure 9:
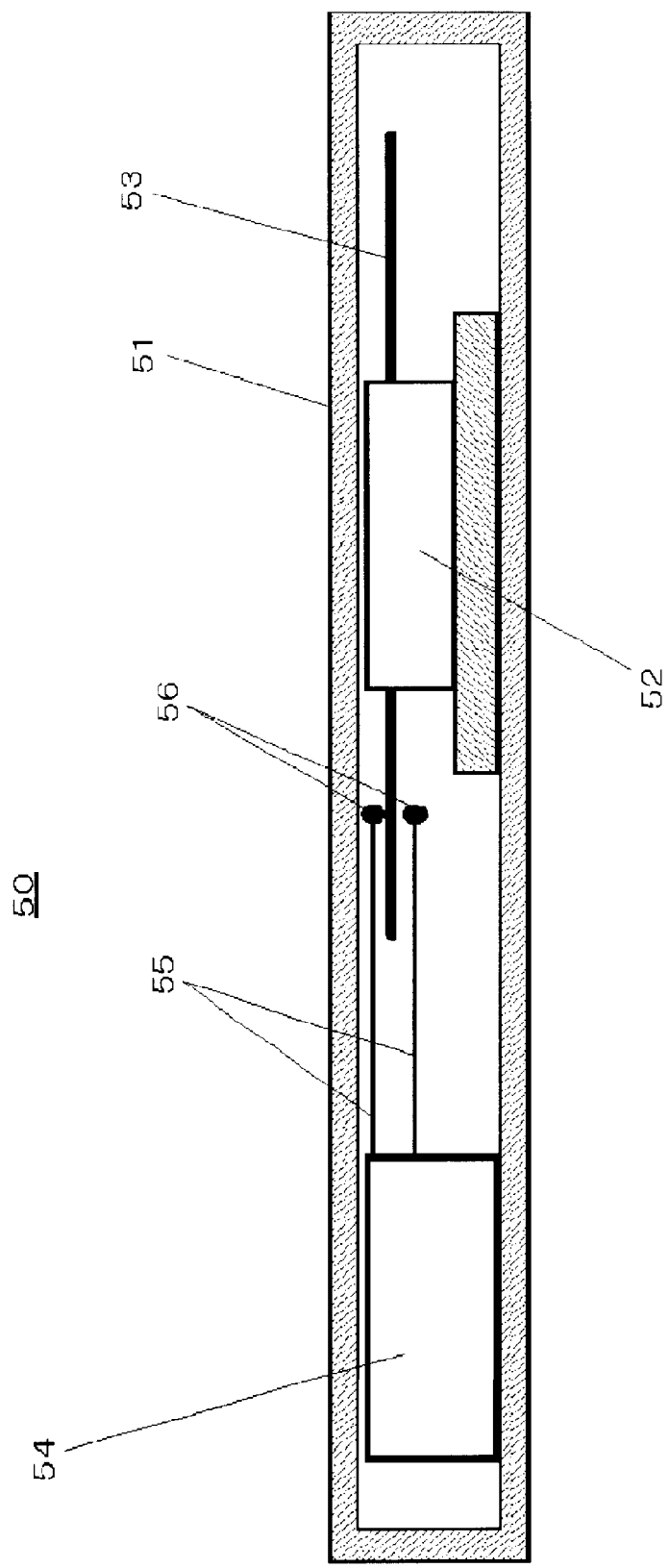
FIG. 9 is a sectional view schematically illustrating the internal configuration of a disk drive.

Reference is made to FIG. 9, in which the internal configuration of a disk drive 50 is illustrated as an exemplary diagram. A clean space where dust and debris are extremely slight is formed inside a housing 51, in the interior of which is disposed a spindle motor 52 on which platter-shaped recording disks for data recordation are fitted. In addition, a head-shifting mechanism 57 that reads data from and writes data onto the recording disks 53 is disposed within the housing 51. The head-shifting mechanism 57 is composed of heads 56 that read/write data on the recording disks 53; arms 55 that support the heads 56; and an actuator 54 that shifts the heads 56 and arms 55 over the needed locations on the recording disks 53.

Employing a spindle motor under the first or second embodiments of the present invention as the spindle motor 52 for the disk drive 50 as such yields desired rotational precision while making it possible to scale the disk drive 50 down into a lower profile and reduce its cost. In addition, the reliability and durability of the disk drive 50 may be improved.

While spindle-motor and disk-drive embodiments in accordance with the present invention have been explained in the foregoing, the present invention is not limited to these embodiments. Various changes and modifications are possible without departing from the scope of the invention.

For example, instead of the pump-in type of spiral grooves 26a that were described in the foregoing embodiments, herringbone grooves that in the radial direction are asymmetrical in contour would be possible as the means provided in the thrust bearing section for generating pressure that acts radially inward on the oil. This would establish a situation in which pumping force from the spiral, radially outwardly located grooves would exceed pumping force from the spiral, radially inwardly located grooves. The amount of imbalance in pumping force between the spiral groove areas would therefore be pressure acting radially inward on the oil.

Here, in a situation in which the above-described herringbone grooves are furnished in the thrust bearing section, the lifting force imparted to the rotor will be higher than the lifting force generated in the spiral grooves. The load-supporting force from the thrust bearing section therefore will be improved, but a downside tied in with the lifting force being generated in the bearing sections is a concern that over-lift on the rotor will arise. Consequently, this must be controlled by means of magnetic urging force imparted to the rotor.

What is claimed is:

1. A spindle motor comprising:

a shaft;

a sleeve formed with a through-hole for rotary-play insertion of the shaft;

a rotor having a round top plate in the rotational center of which the shaft is furnished united, and a circular cylindrical wall depending from the top plate along its outer rim;

a cover member for closing over one end of the through-hole formed in the sleeve;

a circular cylindrical casing member fitted to said shaft over its outer circumferential surface;

micro-gaps formed continuing between an upper-end face of said sleeve and a bottom face of said rotor top plate, an inner circumferential surface of said sleeve and an outer circumferential surface of said casing member, and an inner face of said cover member and end faces of said shaft and said casing member;

oil retained continuously without interruption within said micro-gaps throughout their entirety;

a radial dynamic-pressure bearing section configured intermediarily by at least one surface of either said sleeve inner-circumferential surface or said casing member outer-circumferential surface, and by said oil when said rotor spins, and provided with, as dynamic-pressure-generating striations, herringbone grooves for inducing into said oil when said rotor spins hydrodynamic pressure;

a thrust bearing section configured on at least one of either said sleeve upper-end face or said top plate bottom face, and furnished with dynamic-pressure-generating striations for imparting to said oil radially inward-heading pressure when said rotor spins;

an axial support section, formed between said cover member inner face and said shaft end face, having pressure essentially balancing radially inward-heading pressure generated in said thrust bearing section, wherein said rotor is lifted through cooperation of said thrust bearing section end said axial support section; and a communicating pathway formed in between said shaft along its outer circumferential surface and said casing member along its inner circumferential surface, for communicating said oil retained in, and enabling it to circulate between, the micro-gap formed between said sleeve upper-end face and the bottom face of said rotor top plate, and the micro-gap formed between said cover member inner face and said shaft and casing member end faces.

2. A spindle motor as set forth in claim 1:

a helical groove being formed on the outer circumferential surface of said shaft in a single path running from its upper-end portion to its lower-end portion;

wherein fitting said casing member over the outer circumferential surface of said shaft defines said communicating pathway between said helical groove and the inner circumferential surface of said casing member.

3. A spindle motor as set forth in claim 1:

an outer circumferential surface of said sleeve and an inner circumferential surface of said rotor circular cylindrical wall opposing via a radial gap;

and said sleeve outer circumferential periphery being provided with a taper surface constricting in outer diameter according as it separates from said rotor top plate;

wherein and said oil is retained by a meniscus forming in between said taper surface and the inner-circumferential surface of said rotor circular cylindrical wall.

4. A spindle motor as set forth in claim 3, wherein:

a stepped portion continuous with said taper surface is provided in said sleeve by recessing its outer circumferential surface radially inwardly;

an annular member projecting radially inward corresponding to the stepped portion is fixedly fitted into the inner-circumferential surface of said rotor circular cylindrical wall, and a rotor retainer is constituted by engagement of the stepped portion and the annular member;

a micro-gap smaller than the minimum clearance of the radial gap formed between the taper surface of said sleeve and the inner-circumferential surface of said rotor circular cylindrical wall, is formed to function as a labyrinth seal between the annular member along its upper face and said sleeve stepped portion along its undersurface.

5. A spindle motor as set forth in claim 1, said radial dynamic-pressure bearing section being configured between said shaft outer-circumferential surface end said sleeve inner-circumferential surface as an axially separated pair of radial dynamic-pressure bearing constituents, wherein as the dynamic-pressure-generating striations in each radial bearing constituent, herringbone-groove forming contiguous pairs of spiral grooves for inducing into said oil when said rotor spins hydrodynamic pressure whose pressure gradient becomes axially symmetrical are provided.

6. A spindle motor as set forth in claim 1, said radial dynamic-pressure bearing section being configured between said shaft outer-circumferential surface and said sleeve inner-circumferential surface as an axially separated pair of radial dynamic-pressure bearing constituents, wherein as the dynamic-pressure-generating striations in at least one of either said pair of radial dynamic-pressure bearing constituents, asymmetrically configured herringbone grooves for inducing into said oil when said rotor spins hydrodynamic pressure acting unidirectionally in the axial direction are provided.

7. A spindle motor as set forth in claim 1, wherein said rotor is urged in a direction toward said cover member by axially acting magnetic force.

8. A disk-drive device including a housing, a spindle motor fixed inside said housing for spinning recording disks, and an information access means for writing information into and reading information out from needed locations on the recording disks, wherein said spindle motor comprises:

a shaft;

a sleeve formed with a through-hole for rotary-play insertion of the shaft;

a rotor having a round top plate in the rotational center of which the shaft is furnished united, and a circular cylindrical wall depending from the top plate along its outer rim;

a cover member for closing over one end of the through-hole formed in the sleeve;

a circular cylindrical casing member fitted to said shaft over its outer circumferential surface;

micro-gaps formed continuing between an upper-end face of said sleeve and a bottom face of said rotor top plate, an inner circumferential surface of said sleeve and an outer circumferential surface of said casing member, and an inner face of said cover member and end faces of said shaft and said casing member;

oil retained continuously without interruption within said micro-gaps throughout their entirety;

a radial dynamic-pressure bearing section configured intermediarily by at least one surface of either said sleeve inner-circumferential surface or said casing member outer-circumferential surface, and by said oil when said rotor spins, and provided with, as dynamic-pressure-generating striations, herringbone grooves for inducing into said oil when said rotor spins hydrodynamic pressure;

a thrust bearing section configured on at least one of either said sleeve upper-end face or said top plate bottom face, and furnished with dynamic-pressure-generating striations for imparting to said oil radially inward-heading pressure when said rotor spins;

an axial support section, formed between said cover member inner face and said shaft end face, having pressure essentially balancing radially inward-heading pressure generated in said thrust bearing section, wherein said rotor is lifted through cooperation of said thrust bearing section and said axial support section;

and a communicating pathway formed in between said shaft along its outer circumferential surface and said casing member along its inner circumferential surface, for communicating said oil retained in, and enabling it to circulate between, the micro-gap formed between said sleeve upper-end face and the bottom face of said rotor top plate, and the micro-gap formed between said cover member inner face and said shaft and casing member end faces.

9. A disk-drive device as set forth in claim 8:

a helical groove being formed on the outer circumferential surface of said shaft in a single path running from its upper-end portion to its lower-end portion;

wherein fitting said casing member over the outer circumferential surface of said shaft defines said communicating pathway between said helical groove and the inner circumferential surface of said casing member.

10. A disk-drive device as set forth in claim 8:

an outer circumferential surface of said sleeve and an inner circumferential surface of said rotor circular cylindrical wall opposing via a radial gap;

and said sleeve outer circumferential periphery being provided with a taper surface constricting in outer diameter according as it separates from said rotor top plate;

wherein and said oil is retained by a meniscus forming in between said taper surface and the inner-circumferential surface of said rotor circular cylindrical wall.

11. A disk-drive device as set forth in claim 10, wherein:

a stepped portion continuous with said taper surface is provided in said sleeve by recessing its outer circumferential surface radially inwardly;

an annular member projecting radially inward corresponding to the stepped portion is fixedly fitted into the inner-circumferential surface of said rotor circular cylindrical wall, and a rotor retainer is constituted by engagement of the stepped portion and the annular member;

a micro-gap smaller than the minimum clearance of the radial gap formed between the taper surface of said sleeve and the inner-circumferential surface of said rotor circular cylindrical wall, is formed to function as a labyrinth seal between the annular member along its upper face and said sleeve stepped portion along its undersurface.

12. A disk-drive device as set forth in claim 8, wherein:
said radial dynamic-pressure bearing section is configured between the outer-circumferential surface of said casing member and said sleeve inner-circumferential surface as an axially separated pair of radial dynamic-pressure bearing constituents; and as the dynamic-pressure-generating striations in each radial bearing constituent, herringbone-grooves forming contiguous pairs of spiral grooves for inducing into said oil when said rotor spins hydrodynamic pressure whose pressure gradient becomes axially symmetrical are provided.

13. A disk-drive device as set forth in claim 8, wherein:
said radial dynamic-pressure bearing section is configured between the outer-circumferential surface of said casing member and said sleeve inner-circumferential surface as an axially separated pair of radial dynamic-pressure bearing constituents; and as the dynamic-pressure-generating striations in at least one of either said pair of radial dynamic-pressure bearing constituents, asymmetrically configured herringbone grooves for inducing into said oil when said rotor spins hydrodynamic pressure acting unidirectionally in the axial direction are provided.

14. A disk-drive device as set forth in claim 8, wherein said rotor is urged in a direction toward said cover member by axially acting magnetic force.

* * * * *